Jan. 1, 1952
L. P. LORD
2,581,265
DEVICE FOR OPERATING FASTENINGS FOR DOORS OF VEHICLES
Filed Jan. 25, 1949
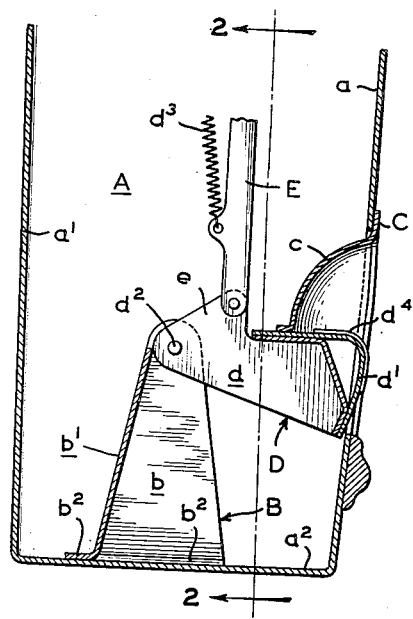
FIG. 1
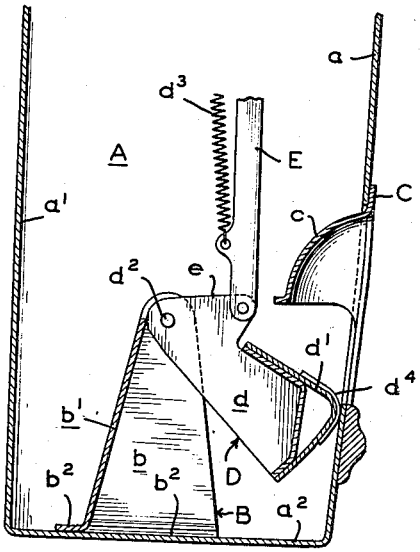
FIG. 3
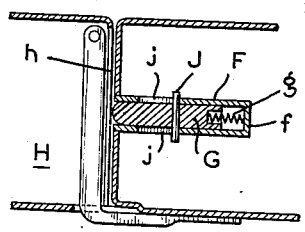
FIG. 5
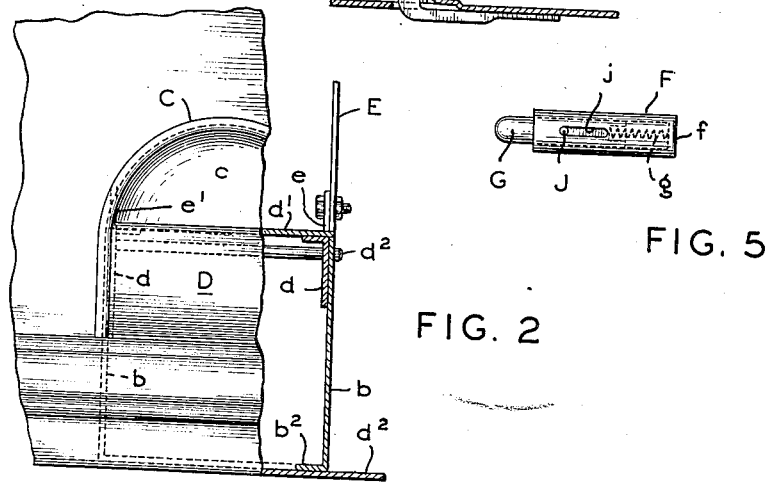
FIG. 4
FIG. 2
INVENTOR.
LEONARD PERCY LORD
BY
A. Yates Dowell
ATTORNEY Patented Jan. 1, 1952

2,581,265

UNITED STATES PATENT OFFICE 2,581,265

DEVICE FOR OPERATING FASTENINGS FOR DOORS OF VEHICLES

Leonard P. Lord, Storridge, near Malvern, England, assignor to The Austin Motor Company Limited, Northfield, Birmingham, England Application January 25, 1949, Serial No. 72,674
In Great Britain January 28, 1948

3 Claims. (Cl. 292—255)

1

The invention relates to fastening means for the doors of motor and other vehicles and has for its object to provide an improved device for operating such fastening means.

A device according to the invention comprises a pedal lever mounted to turn about a horizontal pivot axis located in a recess in one of two parts, being the door and the door jamb, the recess being near the foot of the said part and being of sufficient depth and width to allow of the toe of an operator being inserted thereinto to depress the pedal lever; and there is pivoted to the pedal lever an upwardly extending latch-operating rod. The pedal lever extends outwardly from its pivot axis and is raised to its normal position by spring means.

As it is the intention to dispense with a handle on the outside of the door, the latter is fitted with spring means which cause it to open when the latch bolt is drawn back. Such spring means may open the door to its fullest extent, or, at any rate, sufficiently to allow a hand to be passed behind the door edge thus to open the door.

An embodiment of the invention is described with reference to the accompanying drawings, in which:

Figure 1 is a fragmentary view of the lower part of a vehicle door showing means according to the invention fitted thereto. In this figure the pedal lever is shown as in its normal position.

Figure 2 is as to its right hand side a vertical section taken on the line 2, 2, of Figure 1, and as to its left hand side a view of the device as seen from outside the door.

Figure 3 is a view corresponding to Figure 1, but showing the pedal lever as in its depressed position.

Figure 4 is a detail view in sectional plan view to illustrate spring means for opening the door.

Figure 5 is a detached view in side elevation of the spring means shown in Figure 4.

In these drawings, A indicates the lower part of a door to which the invention is applied. $a$ is the outer wall of the door, $a'$ an inner wall thereof and $a^2$ the base. B is a sheet metal bracket composed of side walls $b, b$ and an inner or rear wall $b'$. The side walls and rear wall each have flanges $b^2$ by which the bracket is secured to the base $a^2$. C is a front arch bordering a recess formed in the front wall $a$ of the door, and $c$ is a part-spherical wall formed integral with the arch C.

D is a pedal lever comprising two sheet metal side walls $d, d$, connected across by a curved metal plate $d'$ on which is secured a rubber tread

2

$d^4$. The rear ends of the sides $d, d$, form lugs embracing a pin $d^2$ which passes at its ends through holes in the side walls $b, b$, of the bracket B. One of the sides $d$ of the pedal lever has an upwardly extending lug $e$ to which is pivoted an upwardly extending latch-operating rod E. A similar lug $e'$ is provided on the other side $d$ to render the device either hand.

When the foot of the operator is removed from the pedal lever the latter is returned to its normal position by a tension coil spring $d^3$.

Secured in the door is a horizontal tube F which is closed at its inner end by a wall $f$ and forms a housing for a slider plunger G which projects through the door edge. A coil spring $g$ bears rearwardly against the wall $f$ of the tube F and forwardly against the rear end of the plunger G.

When the door is closed, the plunger G, by the action of the spring $f$, presses against the edge wall $h$ of the door jamb H. A pin J fixed diametrically across the plunger G passes, at its ends, through longitudinal slots $j, j$, formed in the tube F thus to limit the outward movement of the plunger.

Assuming that the door is shut, but not locked, and it is desired to open it, it is only necessary for the operator to insert the toe of his boot or shoe into the space afforded by the wall $c$ and press downwardly on the tread $d^4$ thus depressing the pedal lever D, drawing down the latch-operating rod E and unlatching the door. The door will then open automatically by the action of the spring $f$ a sufficient amount to allow the operator to grasp the door edge with his hand and open the door to the required extent.

The spring means illustrated is shown only as an example. It will be clear that there are many other forms of spring means which could be used.

The latch mechanism is not shown as there are many known forms of latch mechanism which could be utilised.

It will be obvious that the pedal lever could be fitted in the door jamb in lieu of in the door. This latter arrangement has an advantage in that the opening of the door is not impeded by the foot of the operator.

It will also be obvious that there are many known spring devices by which the door could be opened to its full extent.

Having fully described my invention, what I claim and desire to secure by Letters Patent is:

1. In a device for operating fastening means for doors of vehicles having door and door jamb structure provided with a recess in the lower portion of an outer wall thereof to accommodate the toe end of an operator's foot, an inwardly directed portion on said outer wall defining the rear wall of said recess, a pedal lever mounted to pivot about a horizontally disposed axis located inwardly from the rear wall defining said recess, said lever extending outwardly from said axis and having an upper surface and a depending outer surface which jointly provide a bottom wall for said recess when the lever is in normal inoperative position, an upwardly extending latch-operating rod pivoted to said pedal lever and operable to release a latch when said lever is depressed, and spring means for returning said pedal lever to normal position.

2. In a device for operating fastening means for doors of vehicles having at least one door provided with a recess in the lower portion of an outer wall thereof to accommodate the toe end of an operator's foot, an inwardly directed portion on said outer wall defining the rear wall of said recess, a bracket secured to said door and carrying inwardly of said outer wall a horizontally disposed pivot pin, a pedal lever pivoted on said pivot pin and extending outwardly therefrom, said pedal lever having an upper surface and a depending outer surface which jointly provide a bottom wall for said recess when the pedal lever is in normal inoperative position, an upwardly extending latch-operating rod pivoted to said pedal lever and operable to release a latch when said lever is depressed, and spring means for returning said pedal lever to normal position.

3. In a device for operating fastening means for doors of vehicles having at least one door provided with a recess in the lower portion of an outer wall thereof to accommodate the toe end of an operator's foot, a partly-spherical inwardly directed portion on said outer wall defining the rear wall of said recess, a bracket secured to said door and carrying inwardly of said outer wall a horizontally disposed pivot pin, a pedal lever pivoted on said pivot pin and extending outwardly therefrom, said pedal lever having an upper tread surface and a depending outer surface which jointly provide a bottom wall for said recess when the pedal lever is in normal inoperative position, said tread surface engaging the lower extremity of said inwardly directed portion, an upwardly extending latch-operating rod pivoted to said pedal lever and operable to release a latch when said pedal lever is depressed, and spring means which maintain the pedal lever in normal position and return said lever to that position after each depression thereof.

LEONARD P. LORD.

REFERENCES CITED

The following references are of record in the file of this patent:

UNITED STATES PATENTS

| Number | Name | Date |
|---|---|---|
| 1,282,047 | Conter | Oct. 22, 1918 |
| 1,545,473 | Page | July 7, 1925 |
| 1,882,536 | Weinheimer | Oct. 11, 1932 |
| 2,459,190 | Shuart | Jan. 18, 1949 |